US008638866B2

(12) United States Patent
Martwick

(10) Patent No.: US 8,638,866 B2
(45) Date of Patent: Jan. 28, 2014

(54) ADJUSTABLE TRANSMITTER POWER FOR HIGH SPEED LINKS WITH CONSTANT BIT ERROR RATE

(75) Inventor: Andrew Martwick, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/562,990

(22) Filed: Jul. 31, 2012

(65) Prior Publication Data

US 2012/0294379 A1 Nov. 22, 2012

Related U.S. Application Data

(62) Division of application No. 12/168,621, filed on Jul. 7, 2008, now Pat. No. 8,233,551.

(51) Int. Cl.
*H04L 27/00* (2006.01)
(52) U.S. Cl.
USPC ............................................ 375/259; 375/295
(58) Field of Classification Search
USPC ..................... 375/259, 295, 316; 455/522
See application file for complete search history.

(56) References Cited

U.S. PATENT DOCUMENTS

| | | | |
|---|---|---|---|
| 6,067,458 A * | 5/2000 | Chen | 455/522 |
| 6,341,224 B1 | 1/2002 | Dohi et al. | |
| 6,556,837 B1 | 4/2003 | Kuriyama | |
| 6,950,632 B1 | 9/2005 | Yun et al. | |
| 7,176,721 B2 | 2/2007 | Ho et al. | |
| 7,506,222 B1 | 3/2009 | Talbot | |
| 8,233,551 B2 | 7/2012 | Martwick | |

| | | | |
|---|---|---|---|
| 2004/0209635 A1 * | 10/2004 | Hsu et al. | 455/522 |
| 2006/0200710 A1 | 9/2006 | Webb et al. | |
| 2006/0233279 A1 | 10/2006 | Ryder et al. | |
| 2011/0158244 A1 | 6/2011 | Long et al. | |

FOREIGN PATENT DOCUMENTS

| | | |
|---|---|---|
| EP | 1231733 A1 | 8/2002 |
| GB | 2408420 A | 5/2005 |
| JP | 58-172256 U | 11/1983 |
| JP | 2001-251834 A | 9/2001 |
| JP | 2002-223204 A | 8/2002 |
| JP | 2006-148389 A | 6/2006 |
| WO | 2003/088542 A1 | 10/2003 |

OTHER PUBLICATIONS

Office Action Received for the Taiwanese Patent Application No. 98122758, mailed on Aug. 21, 2012, 9 pages of Office Action and 6 pages of English Translation.

(Continued)

*Primary Examiner* — Daniel Washburn
*Assistant Examiner* — Fitwi Hailegiorgis
(74) *Attorney, Agent, or Firm* — Caven & Aghevli LLC

(57) ABSTRACT

A method and apparatus for dynamically adjusting power of a transmitter is herein described. A transmitter transmits a pattern to a receiver at a differential voltage. The length of the pattern, in one embodiment, is selected to be a reasonable length training pattern, as not to incur an extremely long training phase. If errors are detected at the receiver in the pattern, the transmitter steps the differential voltage until errors are not detected in the pattern at the receiver. The differential voltage, where no errors are detected, is scaled by a proportion of a target confidence level to a measured confidence level associated with the reasonable length training pattern. As a result, a training phase is potentially reduced and power is saved while not sacrificing confidence levels in error rates in the data exchange between the transmitter and receiver.

22 Claims, 4 Drawing Sheets

(56) References Cited

OTHER PUBLICATIONS

Notice of Allowance Received for the U.K. Patent Application No. 1103771.0, mailed on Nov. 15, 2011, 2 pages.
Office Action Received for U.S. Appl. No. 12/168,621, mailed on Nov. 28, 2011, 13 pages.
Office Action Received for U.S. Appl. No. 12/168,621, mailed on Jun. 10, 2011, 13 pages.
Notice of Allowance Received for U.S. Appl. No. 12/168,621, mailed on Feb. 14, 2012, 13 pages.
Office Action Received for Japanese Patent Application No. 2009-160232, mailed on Sep. 13, 2011, 3 pages of Office Action and 2 pages of English Translation.
Office Action Received for Chinese Patent Application No. 200910159706.1, mailed on Feb. 24, 2012, 5 pages of Office Action and 9 pages of English Translation.
Combined Search and Examination Report received for the U.K. Patent Application No. 1103771.0, mailed on Jun. 23, 2011, 4 pages.
Office Action received for the German Patent Application No. 10 2009 032 072.5, mailed on Aug. 18, 2010, 6 pages of Office Action and 6 pages of English Translation.
Kaul et al., "DVS for On-Chip Bus Designs Based on Timing Error Correction.", In: Proceedings of the conference on Design, Automation and Test in Europe, 2005, vol. 1, pp. 80-85.
Worm et al., "An Adaptive Low-power Transmission Scheme for On-Chip Networks.", In: Proceedings of the 15th International Symposium on System Synthesis, Oct. 2-4, 2002, pp. 92-100.
Silventoinen et al., "Fast power control for GSM HBS Using Training Sequences", In Vehicular Technology Conference, IEEE, 1997, vol. 3, pp. 1689-1693.
Office Action received for the U.K. Patent Application No. 0911565.0, mailed on Aug. 28, 2009, 8 pages.
Notice of Allowance Received for the Japanese Patent Application No. 2009-160232, mailed on May 8, 2012, 1 page of Notice of Allowance Only.
Office Action received for Chinese Patent Application No. 200910159706.1, mailed on May 6, 2013, 8 Pages including 5 Pages of English Translation.
Office Action received for Chinese Patent Application No. 200910159706.1, mailed on Nov. 5, 2012, 10 Pages including 6 Pages of English Translation.

* cited by examiner

ADJUSTABLE TRANSMITTER POWER FOR HIGH SPEED LINKS WITH CONSTANT BIT ERROR RATE

CROSS-REFERENCE TO RELATED APPLICATIONS

This application is a divisional of patent application Ser. No. 12/168,621, filed on Jul. 7, 2008, now U.S. Pat. No. 8,233,551 issued Jul. 31, 2012, which is hereby incorporated herein by reference and for all purposes.

FIELD

This invention relates to high speed links, and in particular, to power savings associated with high speed links.

BACKGROUND

As computers have evolved, they have moved from the realm of simple arithmetic computing to media centers for any number of media and non-media related applications. As a result, computer systems often include any number of peripheral or input/output devices. Furthermore, the advancement in semi-conductor processing and computer design have enabled computer systems to include more transistors and processing power on single physical processors, while also allowing multiple physical processors to reside in a single system.

As a corollary to the advancement of integrated circuits, and the processing power thereof, interconnects between the devices have also advanced to provide adequate bandwidth to high-power components. As a specific example, components in the architecture may be coupled utilizing point-to-point links.

However, often transmitters for these links are designed to operate at power levels to meet extreme specification guidelines. For examples, specifications for physical links, i.e. transmission lines, between a transmitter and receiver may exist, which define both length and other attributes. As a result, a transmitter often operates at a high power level to ensure proper transmission of data across a maximum length transmission line; even when the actual link/transmission line is shorter than a specified maximum. As a result, extra power is potentially consumed to ensure accurate data transmission, when less power may be utilized with the same accuracy of data transmission.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific interconnects, specific sigma values, specific signal amplitudes and scaling factors thereof, specific types, numbers, and sizes of test patterns, etc. in order to provide a thorough understanding of the present invention. It will be apparent, however, to one skilled in the art that these specific details need not be employed to practice the present invention. In other instances, well known components or methods, such as specific transmitter and receiver logic, checksum and bit error detection algorithms, other operational details of interconnects and associated logic, etc. have not been described in detail in order to avoid unnecessarily obscuring the present invention.

The method and apparatus described herein are for adjusting a transmitter's amplitude to optimize power consumption. Specifically, adjusting power of a transmitter is primarily discussed in reference to illustrative links, such as a point-to-point coherent interconnect architecture. However, the methods and apparatus for adjusting transmitter power are not so limited, as they may be implemented with any known interconnect, such as any of the interconnects described in FIG. 1, as well as in conjunction with any other known interconnect utilized to connect a transmitter to a receiver.

Figure 1:
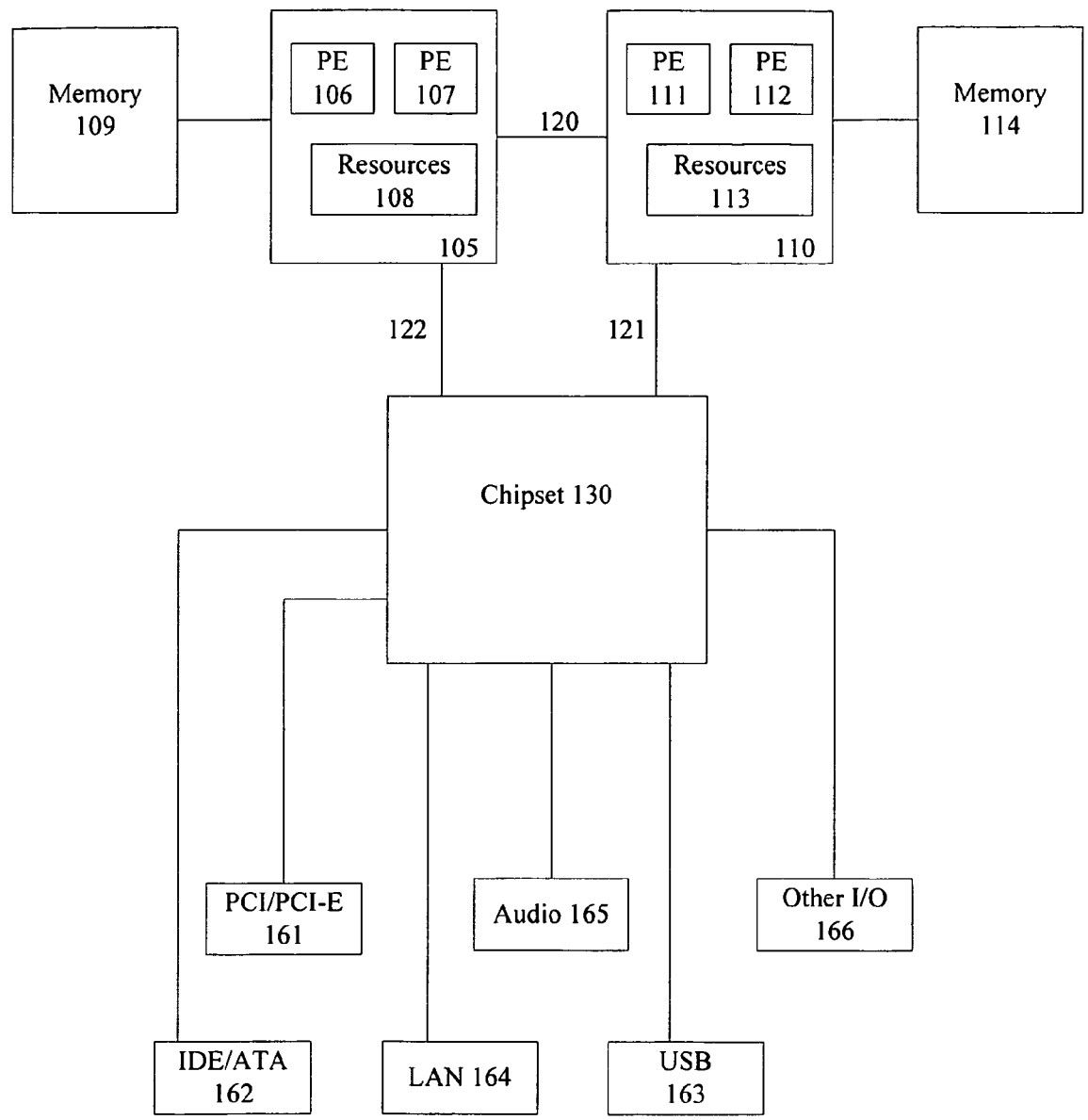
FIG. 1 illustrates an embodiment of a system including multiple processors coupled to a chipset utilizing a point-to-point interconnect, as well as other potential interconnects coupled to a chipset.

FIG. 1 illustrates an embodiment of a system including multiple different interconnects. The system of FIG. 1 may also include several processors, of which only two, processors 105, 110 are shown for clarity. As illustrated, processors 105, 110 each include two processing elements 106-107, 111-112; although, any number of processing elements may be included in processors 105, 110.

A processing element refers to a thread unit, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. As an example, a physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread, which may also be referred to as a physical thread, typically refers to any logic located on an integrated circuit capable of maintaining an independent architectural state, wherein the independently maintained architectural states share access to execution resources. Therefore, as can be seen, multiple software threads, such as multiple replications of a single-threaded application, in one embodiment, are capable of being executed in parallel on multiple processing elements, which may include a combination of any of the aforementioned processing elements, such as cores or hardware threads.

Also illustrated in processors 105, 110 are resources 108, 113, which typically include registers, units, logic, firmware, memory, and other resources to execute code or interface with other devices. As stated above, some of resources 110 may be partially or fully dedicated to processing elements, while others are shared among processing elements. For example, smaller resources, such as instruction pointers and renaming logic may be replicated for physical threads. Some resources, such as re-order buffers in a reorder/retirement unit, instruction lookaside translation buffer (ILTB), load/store buffers, and queues may be shared through partitioning. Other resources, such as general purpose internal registers, page-table base registers, low-level data-cache, a data-TLB, execution unit(s), and an out-of-order unit are potentially fully shared among threads. In contrast, cores may have dedicated execution resources, while sharing at least a portion of a higher level cache, such as a second level cache (L2).

In one embodiment, resources 108, 113 include a processor pipeline, which may include any number of pipeline stages. Common examples of pipeline stages include an instruction pointer stage, a fetch stage, a decode stage, a drive stages, and allocate stage, a renaming stage, a queue stage, a reorder stage, a schedule stage, a dispatch stage, an execution stage, a memory access stage, and a register access stage. Note this list of stages includes an exemplary non-exhaustive list of processor pipeline stages, as any known pipeline stages may be included in processor 100.

Processors 105, 110 may each also include a memory controller or a local memory controller hub (MCH) to interface with memory 109, 114, accordingly. Memories 109, 114 include any memory device, such as a Random Access Memory (RAM), cache memory, flash memory, or other memory device. In one embodiment, memory 114 includes a higher-level cache memory, while resources 113 includes a low-level cache memory. In another embodiment, memory 109 includes a Dynamic Random Access Memory (DRAM) associated with processor 105, which includes a cache memory to cache data from DRAM 109. Note this is an illustrative embodiment, as memories 109,114 potentially include any style memory device.

In one embodiment, where memories 109,114 include cache memories either included within processors 105,110, or external thereto as illustrated, processors 105,110 are capable of being a home node as well as a peer caching node. For example, when a transaction references a memory location within memory 109, the agent responsible for memory 109, i.e. processor 105, is determined to be a home agent in relation to the transaction and the memory location. Similarly, with a transaction referencing another memory location, such as a location in memory 114, processor 105 is determined to be a peer-caching agent.

As can be seen, point-to-point links 120-124 couple components together in a point-to-point fashion. Physical links 120-124, in one embodiment, each include a bidirectional differential signaling interconnect, such as the physical links associated with a physical layer discussed below in reference to FIG. 2. As a result, processors 105,110 and chipset 130 are capable of direct communication with each other. In one embodiment, the transmitters are capable of adjusting power based on an error rate, as described below. Furthermore, the receivers, in one embodiment, are capable of receiving patterns and determining if errors occur in the patterns. Here, the receivers provide feedback to the transmitters to enable efficient determination of an optimal power setting for the transmitters.

Chipset 130 is often a generic reference to multiple integrated circuits, such as a memory controller hub coupled to an input/output (I/O) hub. However, in one embodiment, where agents each include a version of a memory controller hub to interface with memory, chipset 130 refers to an I/O hub or other controller hub. In one embodiment, chipset 130, as discussed above, is a non-caching agent to participate or witness transactions. However, chipset 130 is not so limited, as in other embodiments, chipset 130 is a caching agent including a cache memory and/or a home agent including a memory having original memory location repositories for data.

As illustrated, chipset 130 is also to interface with a plurality of interconnect and I/O devices, such as Peripheral Component Interconnect (PCI) or PCI Express (PCI-E) device 161, Integrated Device Electronics (IDE) or Advanced Transfer Attachment (ATA) device 162, Universal Serial Bus (USB) device 163, Local Area Network (LAN) or Wireless LAN (WLAN) device 164, Audio device 165, and Other I/O device 166, which may also include another interconnect architecture for coupling I/O devices as described herein. Similar to the discussion above, any of the aforementioned interconnect may include transmitters and receivers capable of determining optimal power settings based on error rates, as described below.

Figure 2:
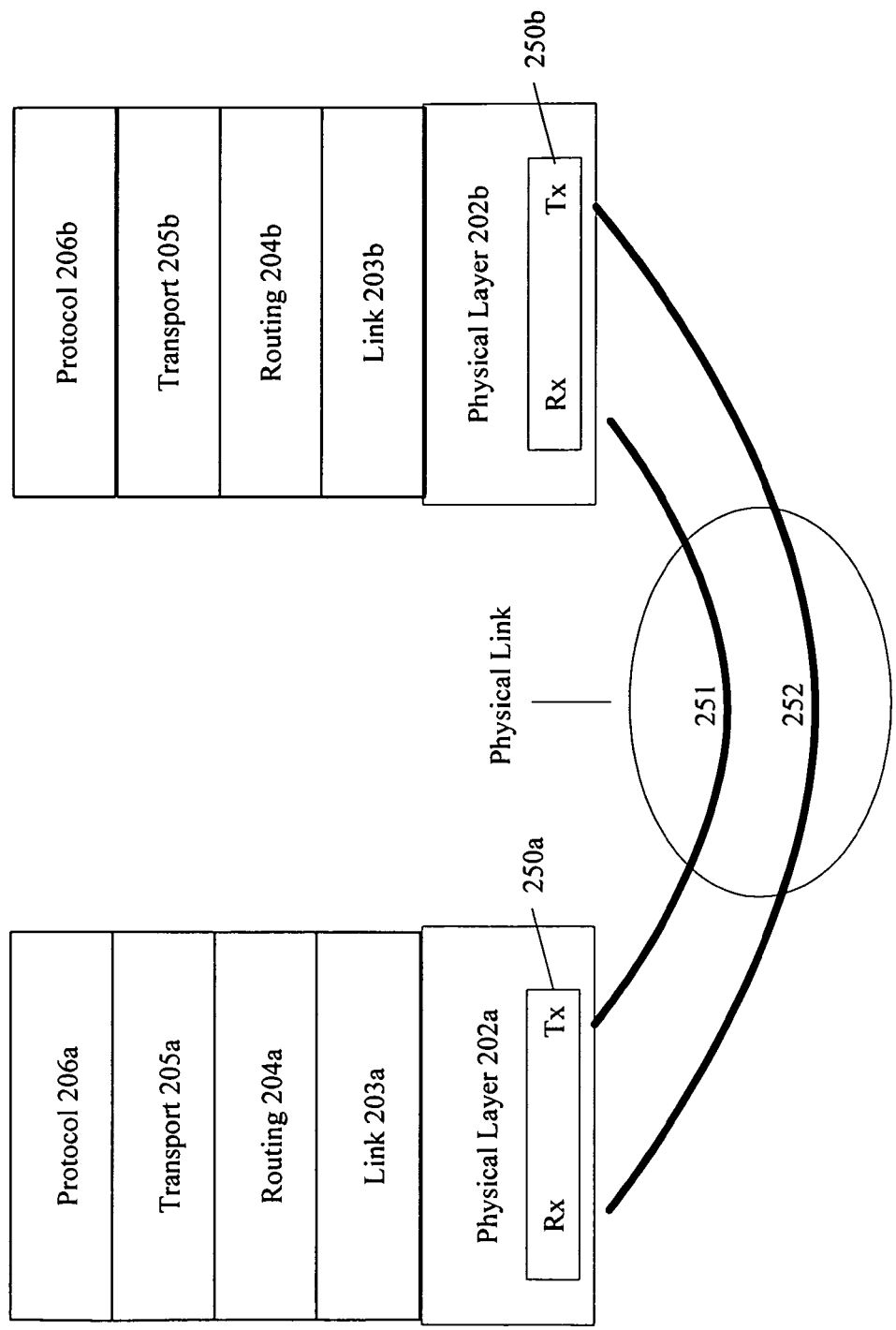
FIG. 2 illustrates an embodiment of a block diagram for a bidirectional interconnect architecture utilizing a layered interconnect stack.

Referring to FIG. 2, an embodiment of a block diagram for a bidirectional interconnect architecture utilizing a layered interconnect stack is illustrated. Reference to layers of FIG. 2, such as a physical layer 202, includes discussion of a generic layer, which may be implemented in different agents, such as physical layer 202a and physical layer 202b. As depicted, the interconnect stack is partitioned into five layers, one or more of which are potentially optional based on a design implementation. For example, routing layer 204, in one embodiment, is embedded in the functionality of link layer 203; hence, routing layer, in one embodiment, is not a separate and distinct layer.

In one embodiment, physical layer 202 is responsible for electrical transfer of information on a physical medium. For example, a physical point-to-point link is utilized between link layer entities 203a and 203b. As an illustrative example, the physical link includes a differential signaling scheme, which includes a bidirectional differential signaling pair 251 and 252. Here, the physical layer is potentially logically divided into an electrical sub-block and a logical sub block, such that the physical layer is to isolate the rest of the stack from the electrical transfer of information and is to communicate with link layer 203. Note that transmitters 250a, 250b in one embodiment, are capable of adjusting amplitude of transmitted signals, and thereby its power consumed, based on error rates, as described below.

In one embodiment, link layer 203 abstracts physical layer 202 from upper layers of the stack and provides link related services, such as reliable data transfer and flow control between connected agents/entities and virtualization of a physical channel/interface into multiple virtual channels and message classes. Here, virtual channels may be viewed as multiple virtual networks for use by upper layers of the stack. For example, protocol layer 206 potentially relies on the abstraction provided by link layer 203 to map a protocol message into a message class and, therefore, to one or more virtual channels.

Routing layer 204, in one embodiment, provides a flexible method for routing packets from a source to a destination. As stated above, in extremely simple topologies, routing layer 204 may not be explicit, but rather integrated into the functionality of link layer 203. For example, routing layer 204 may rely on the abstraction of link layer 203 to specify a <port, virtual network> pair to route a packet.

In one embodiment, routing layer 204, or logic associated therewith through its functionality, is to hold routing information, such as a routing table. As a specific example, a routing table may include an entry for each target in an interconnect architecture. Here, the entry may hold any type of information, such a port or ports to route a packet associated with a target agent through. Routing tables and associated information are discussed in more detail below.

In one embodiment, transport layer 205 provides end-to-end reliable transmission services. Similar to routing layer 204, transport layer 205 is also optional based on design implementation. As an example, transport layer 205 relies on routing layer 204 services to provide reliable transmission support for protocol layer 206. Within an interconnect architecture, in one embodiment, a subset of components include transport layer 205. As a result, this subset of components define sub-fields of packets relating to transport layer 205, while other components potentially do not define those sub-fields.

Protocol layer 206, in one embodiment, is to implement a higher-level communication protocol between nodes/agents, such as cache coherence, ordering, peer-to-peer communication, interrupt deliver, etc. In other words, protocol layer 206 defines permissible messages, requests, responses, phases, coherence states, etc. for nodes or agents, such as home nodes, peer nodes, caching nodes, and non-caching nodes, accordingly. Examples of messages, such as home node messages, snoop messages, response messages, etc. are discussed below.

Note that discussion of layers, and logic associated therewith, may be coupled in any manner. For example, it may be said that protocol logic is coupled to physical layer, i.e. transmission or receiving logic. Here, as can be seen from FIG. 2, in one embodiment, protocol logic may not be directly coupled to physical layer logic, but rather coupled through other layer logic. Furthermore, the interconnect stack, in one embodiment, is coupled to inner component logic, such as cache control or cache memory logic, to initiate appropriate cache coherence actions. Also note that the description of the interconnect stack and bi-directional serial links are purely illustrative, as the transmitters described below may be implemented in any known interconnect.

Figure 3:
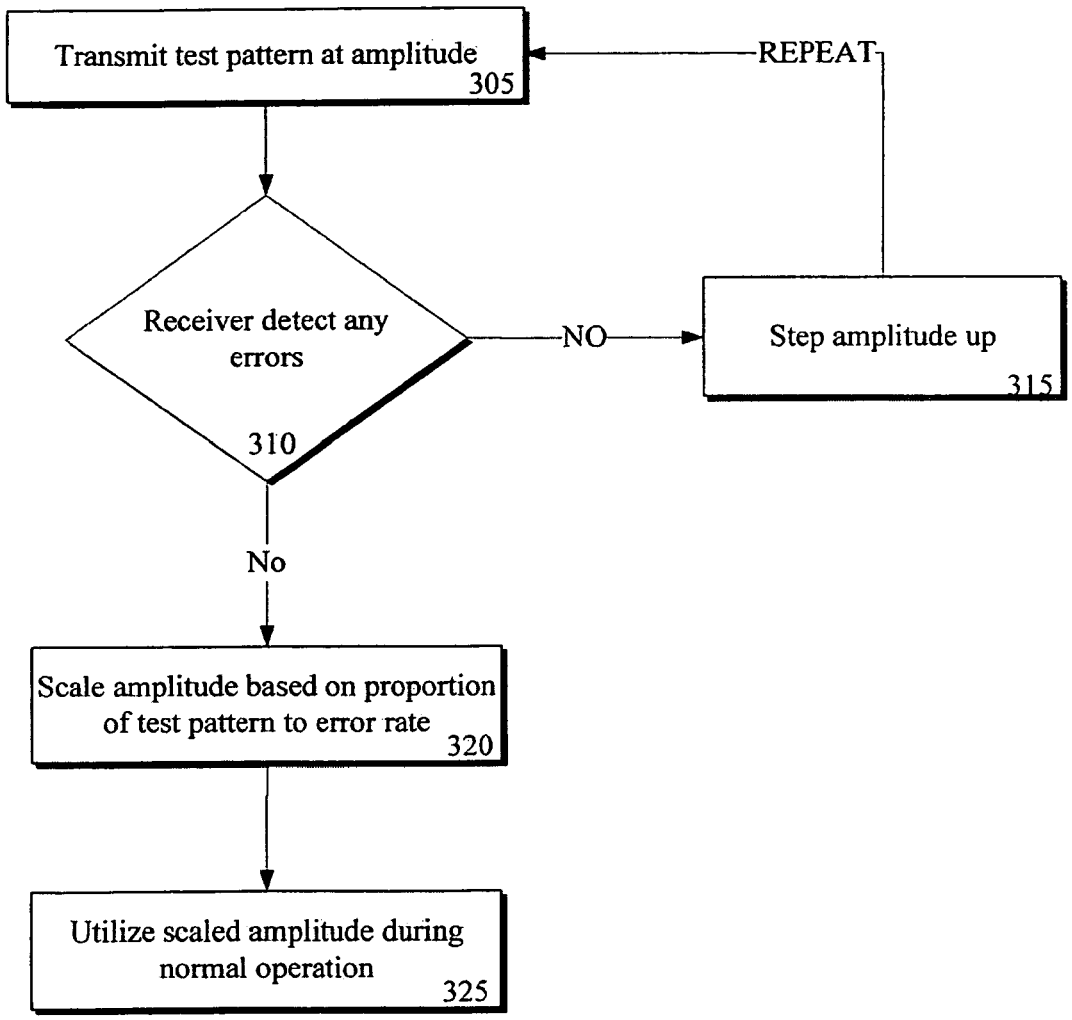
FIG. 3 illustrates an embodiment of a flow diagram for a method for determining optimal transmitter amplitude based on an error rate.

Turning to FIG. 3, an embodiment of a block diagram for a method of adjusting amplitude, and thereby, power of a transmitter based on error rates is illustrated. In block 305, a transmitter transmits a pattern at an amplitude on a link. In one embodiment, a transmitter includes any transmission logic associated with an integrated circuit from transmitting bits, symbols, and/or patterns. Note that bits, symbols, and patterns thereof may be utilized interchangeably for some embodiments. Often, symbols refer to some representation of a number of bits; however, in a simple embodiment, a symbol potentially refers to a single logical value.

The transmitter may be located in any device or agent, such as within an interconnect agent/node to be coupled through an interconnect to another device, such as a receiving agent. Common examples of interconnect agent pairs, both of which may be a transmitting agent and a receiving agent depending on the transaction, include: a processor and memory controller hub, two processors, a root interconnect hub and interconnect device, an I/O controller hub and an I/O device, two I/O devices, or any other pair of agents/device that are known to be coupled together through a link or interconnect.

The link includes any known interconnect for coupling integrated circuits. For example, physically the link may look like a transmission line or a combination of transmission lines. Previous link implementations in materials, such as FR4, included copper or other conductive material. As a whole, the link may include a parallel multi-drop bus, a serial link/interconnect, a point-to-point link, a cache coherent link, other known interconnect, or a combination thereof. Note, as described above, a link or interconnect may be comprised of multiple transmission pairs, such as multiple I/O circuits of one device coupled to multiple I/O circuits of another device. In one embodiment, individual transmitters separately adjust power/voltage. In another embodiment, multiple I/O circuits including transmitters are adjustable to a single matching voltage.

In one embodiment, amplitude, at which bits, patterns, or values are transmitted at, refers to a magnitude of oscillation of a wave. For example, bits, i.e. logical zeros and ones are transmitted utilizing different voltage levels to represent logical values. To illustrate, a high voltage level, which is above a threshold, includes a logical one, while a low voltage level, which is below the threshold, includes a logical zero.

As a result, in one embodiment, the amplitude is referred to as differential voltage, i.e. a difference between the maximum target voltage and a minimum target voltage. For example, if a maximum voltage is 800 mv, i.e. a target for a logical one, and a minimum voltage is 200 mv, i.e. a target for a logical zero, then the differential voltage is 600 mv. In other words, the wave has a 600 mv amplitude. Note that transmission path effects, such as cross-coupling, impedance mismatches, and other factors may result in minor deviations from the target voltages, which is often referred to through terms such as undershoot, overshoot, ringing, etc. Therefore, as can be seen, the more voltage utilized to transmit patterns in waves, the more power that is consumed, as power is a function of voltage. Furthermore, modification of differential voltage or amplitude may be performed indirectly, such as increasing/decreasing an operating voltage of an integrated circuit so a generated wave has a modified amplitude.

In one embodiment, the pattern transmitted by a transmitter includes normal interconnect values transmitted during normal operation of the transmitter, or I/O circuit. Alternatively, in another embodiment, the pattern includes a test pattern during an initialization, a test, and/or a training phase of a system, during an initialization, a test, and/or a training phase of an integrated circuit/agent including the transmitter, or specifically during an initialization, a test, and/or a training phase of the transmitter itself. Here, a test pattern may include any pattern, such as a predetermined pattern to stress the transmitter or initialize the transmitter, a random pattern, or other known combination of bits, symbols, or patterns. For example, in a Universal Serial Bus (USB) interconnect, a test pattern or message may include an entire scrambler output with an input data of zero plus a lone bit pattern.

In one embodiment, which is described in further detail below, the length of the pattern is optimized to provide a balance between a confidence level in determining a correct amplitude/differential voltage level and reducing a training, test, or initialization time. For example, assume obtaining an extremely high confidence in a differential voltage level of a transmitter includes a receiver, in this example, receiving a multiple of $1/10^{-12}$ bits to correctly identify a bit error rate (BER). Here, a training sequence of $8*(1/10^{-12})$ bits potentially provides an 8 sigma confidence level on a mathematical distribution, such as a normal or Gaussian distribution. However, a multiple of $1/10^{-12}$ bits, such as $8 \times 10^{-12}$ bits, is an extremely long pattern, which in many systems is potentially too long to initialize or train a device.

In contrast, a smaller bit pattern, say $8*(1/10^{-5})$ may be utilized, which saves on the length of training, test, and/or initialization. However, this length of pattern, in this example, provides a four sigma confidence level instead of an eight sigma confidence level. Therefore, in one embodiment, the length of the pattern, i.e. the number of bits in the pattern, is selected to be associated with a different confidence level from a high or predetermined confidence level. The training is performed using the pattern associated with the lower confidence level and voltage/amplitude scaling is performed to obtain an approximated higher confidence level, as described below.

In one embodiment, the transmitter is to dynamically adjust the amplitude at which it transmits signals based on an error rate associated with the pattern. One embodiment of such a dynamic adjustment is illustrated in blocks 310 through 325. In decision block 310 it is determined if a receiver that receives the pattern detects any errors. Any known error detection method/algorithm may be utilized. As an example, a cyclic redundancy check (CRC) algorithm is utilized to detect errors. A CRC often takes an input data stream or bit pattern and outputs a value of a certain size. This output value is transmitted to the receiver and compared against a receiver generated CRC. This checksum allows the receiver to determine if any transmission errors occurred.

For example, if the amplitude or differential voltage is too low for a transmitted logical one, the receiver may interpret the low value as a logical zero instead of the correct logical one. When the new CRC value is calculated at the receiver it is different from the original CRC value, which indicates an error occurred during transmission. However, any known checksum, error detection code, validation, error detection mechanism, or a combination thereof may be utilized to detect errors in a pattern generated at a transmitter and received at a receiver. Also note that detection of "any" errors in block 310, may alternatively, be a detection of less than a number of errors, such as a predetermined number of errors.

If errors are detected, then at block 415 the amplitude of the transmitter is stepped, or dynamically adjusted, and the flow returns to block 305. Note that any initial amplitude may be utilized, as well as any interval of amplitude/voltage may be utilized to step/adjust a signal at a transmitter. In one embodiment, the initial amplitude is a minimum voltage differential capable of being transmitted by the transmitter. In another embodiment, the initial amplitude is a calculated minimum amplitude.

To provide an illustrative example, a specification for an interconnect may provide a minimum transmission line length for a link, while a receiving agent defines a noise or threshold specification that a signal must be greater than to be interpreted correctly at the receiver. Here, the minimum amplitude may include the noise level expressed in voltage plus the calculated attenuation of a channel/transmission line at a minimum length. In other words, the minimum voltage level at the transmitter that through attenuation of the shortest specified transmission line would be decipherable by a receiver. To provide a numerical example, assume a receiver requires 20 mv of differential voltage to interpret a wave and the shortest channel length due to calculation results in approximately 80 mv of attenuation. Consequently, in this example, a minimum amplitude level may be set at 100 mv.

However, the usage of shortest channel length and receiver specifications is purely illustrative, as a designer of an I/O circuit may choose any initial voltage to perform a training sequence at, whether it be arbitrary or calculated based on any number of interconnect related variables. Similarly, the stepping or adjustment of amplitude may also be arbitrary or calculated. For example, a designer may choose to step differential voltage for the minimum of 100 mv at 10 mv, 20 mv, 50 mv, 100 mv, 200 mv, etc., as well as based on a percentage. If a percentage of 20% is utilized, then a first step is from 100 mv to 120 mv and a second step is from 120 mv to 144 mv.

Therefore, as the initial voltage differential, and stepping thereof, are potentially design dependent, it is more generally observed that the flow between blocks 305, 310, and 315 continues until there are no detectable errors, or in another embodiment, less than a predetermined number of errors, are detected in block 310. In one embodiment, where the pattern length is associated with a confidence level lower than a predetermined confidence level, such as a high confidence level, then after detecting no errors in decision block 310, the determined amplitude is scaled to obtain a higher confidence level in block 320. In other words, a minimum voltage for a transmitter is determined during a shortened training, i.e. a shortened pattern length, where no errors are received. However, to buffer our confidence level associated with that shortened pattern length, the differential voltage is increased to provide that buffer in our confidence level.

In one embodiment, scaling in block 320 is based on a confidence level associated with the pattern length. Here, as an example, a ratio or proportion of the high or predetermined confidence level to the selected/lower confidence level associated with the shortened pattern length is utilized for scaling. To continue the oversimplified illustrative numerical example from above, assume we started in block 305 with an initial voltage differential of 100 mV. However, the flow continued through blocks 305, 310, and 315 with a stepping of 50 mV each time until we reached an amplitude of 200 mV were no errors were detected. Assuming the shortened pattern length is associated with a confidence level of four sigma in a Gaussian distribution and our predetermined high confidence level is associated with a confidence level of seven sigma, then the amplitude is scaled by 7/4, i.e. an amplitude of approximately 350 mV. Here, the newly scaled amplitude at the transmitter of 350 mV essentially provides us with an approximation of the higher confidence level of seven sigma, while saving time during a training phase by utilizing a shorter training pattern.

Figure 4:
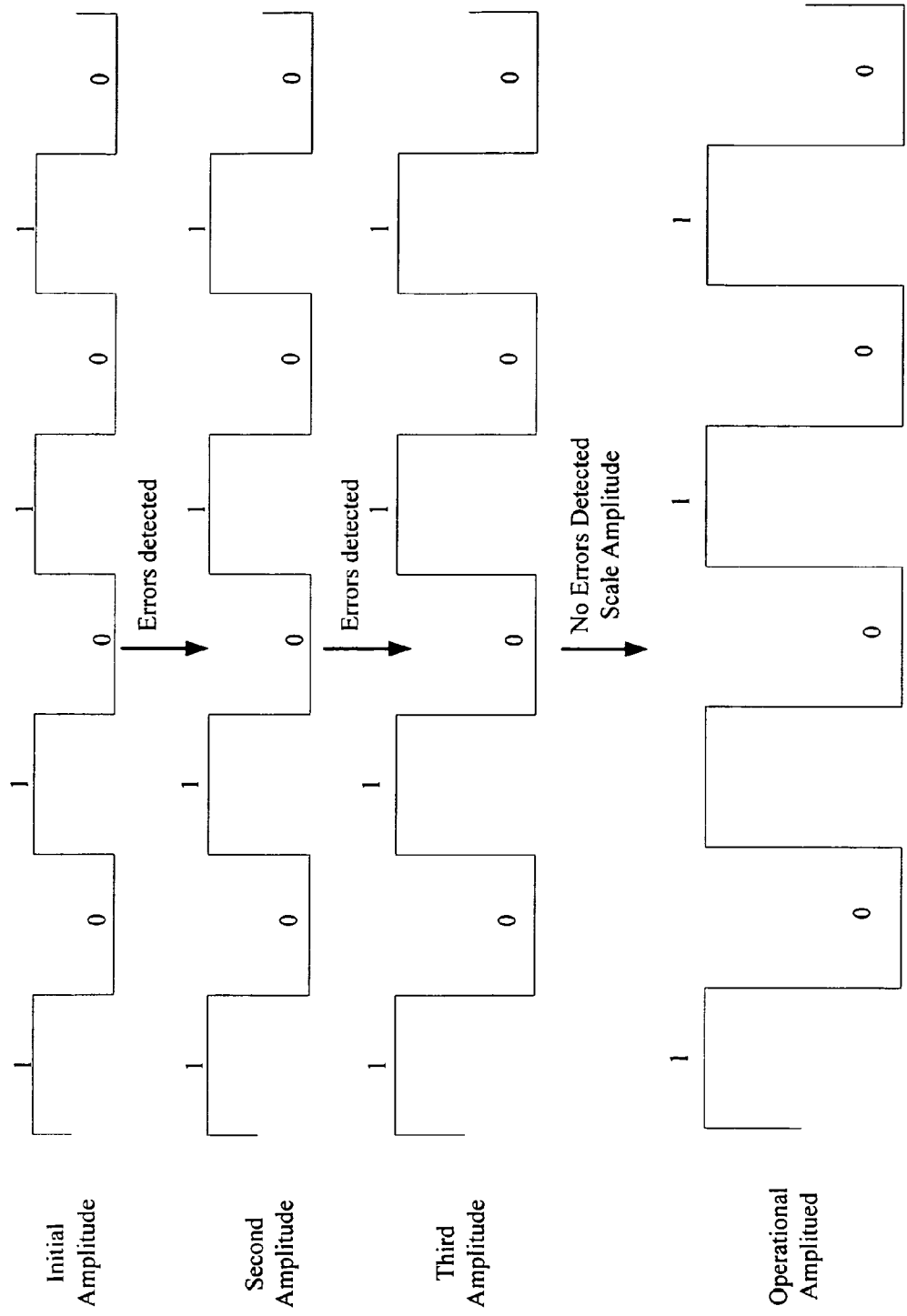
FIG. 4 illustrates an embodiment of an exemplary training phase to determine an operational amplitude for a transmitter.

Referring to FIG. 4, an embodiment of a training sequence to adjust power of a transmitter to an optimal level is illustrated. Note that the illustrated training pattern is purely illustrative and extremely oversimplified. However, here a transmitter transmits a pattern, such as a training pattern, at an initial amplitude, such as 100 mV. However, the receiver detects errors upon receiving the pattern, and consequently, generates a message to the transmitter that errors have been detected. In response to the errors being detected, the transmitter scales/steps the amplitude of generated signals to a second amplitude, such as 150 mV.

Here, a pattern, which may the same or different pattern, is transmitted at the second scaled amplitude. Similarly, errors are detected, and the transmitter receives another error message from the receiver indicating errors were detected during the training sequence. However, upon the next stepping, i.e. the third amplitude of 200 mV, no errors are detected. Assuming the pattern length provides us with a four sigma confidence level on a Gaussian distribution and our target/predetermined confidence level is 7 sigma, then the third amplitude is scaled by the ratio of confidence levels, i.e. 7/4, to obtain an amplitude of 350 mV.

Consequently, both in block 325 of FIG. 3 and the illustration of FIG. 4, this scaled amplitude it utilized during normal operation. As described above, similar transmitter amplitude, voltage, and/or power adjustment may also take place during normal operation utilizing normal traffic, rather than a training sequence or random pattern. As a result, a transmitter, during operation, in one embodiment, dynamically adjusts its power consumption based on error rate. Here, if a receiver starts detecting too many errors, an error signal is sent by the receiver to the transmitter and the transmitter scales voltage appropriately.

Therefore, as can be seen from above, a transmitter potentially determines an optimal power setting based on actual physical interconnect configuration, instead of operating at a high power to ensure maximum interconnect specifications are met. Furthermore, through use of shorter training pattern lengths time may be saved during initialization, while amplitude scaling based on confidence levels provides an appropriate high confidence level that error rate specifications will be met. As a result, initialization time and power is potentially saved without sacrificing transmission accuracy, and confidence thereof.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
an interconnect agent including a transmitter to transmit a pattern on a link at an amplitude, wherein the transmitter is to dynamically adjust power consumption based on an error rate associated with the pattern, wherein the pattern includes a training pattern to be transmitted during a training phase, and wherein the transmitter is to dynamically adjust power consumption based on an error rate associated with the pattern comprises: the transmitter to step the amplitude of a subsequent training pattern to a stepped amplitude in response to receiving a message from a receiving agent indicating errors are detected in the pattern at the receiver, wherein a first amplitude level is to be scaled to a second amplitude level, wherein a target confidence level value and a measured confidence level value associated with a first number of bits, on the link, are to be determined and the target confidence level value is to be divided by the measured confidence level value to obtain a scaling value, wherein the first amplitude level is to be scaled by the scaling value to obtain the second amplitude level.

2. The apparatus of claim 1, wherein the transmitter is to dynamically adjust power consumption based on an error rate associated with the pattern includes: the transmitter to scale an operating voltage of the transmitter such that subsequent cycles are transmitted at a proportional multiple of the stepped amplitude in response to receiving a no-error message from the receiver indicating no errors are detecting in the subsequent pattern at the receiver.

3. The apparatus of claim 2, wherein the proportional multiple of the amplitude includes a ratio of a target confidence level and a measured confidence level associated with a length of the pattern.

4. The apparatus of claim 1, wherein the transmitter is to dynamically adjust power consumption based on an error rate associated with the pattern includes: the transmitter to scale an operating voltage of the transmitter such that subsequent cycles are transmitted at a proportional multiple of the amplitude, and wherein the proportional multiple of the amplitude includes a ratio of a target confidence level and a measured confidence level associated with a length of the pattern.

5. The apparatus of claim 4, wherein the interconnect agent is selected from a group consisting of a processor, a controller hub, a Peripheral Component Interconnect (PCI) device, a PCI Express device, a storage device, a network device, an audio device, and a serial bus device.

6. An apparatus comprising:
transmitter logic to transmit a first number of bits on a link at a first differential voltage, wherein the first number of bits is to be associated with a first confidence value; and
receiver logic to receive a no-error message to indicate no errors associated with the first number of bits were detected;
wherein the transmitter logic is to scale the first differential voltage by a ratio of a target confidence value to the first confidence value in response to receiving the message, wherein the first differential voltage is to be scaled to a second differential voltage, wherein the target confidence value and a measured confidence level value associated with the first number of bits are to be determined and the target confidence value is to be divided by the measured confidence level value to obtain a scaling value, wherein the first differential voltage is to be scaled by the scaling value to obtain the second differential voltage.

7. The apparatus of claim 6, wherein the first number of bits is to be associated with a first confidence value includes the first number of bits to be associated with a first sigma value of a Gaussian distribution, and wherein the target confidence value is to be a second sigma value of the Gaussian distribution.

8. The apparatus of claim 6, wherein the receiver logic is further to receive an error message to indicate errors associated with the first number of bits were detected, and wherein the transmitter logic is further to step the first differential voltage by a stepping voltage to a second differential voltage in response to receiving the error message.

9. The apparatus of claim 8, wherein transmitter logic is further to retransmit the first number of bits at the second differential voltage and to scale the second differential voltage by the ratio of the target confidence value to the first confidence value in response to receiving the no-error message after the transmitter logic retransmits the first number of bits.

10. The apparatus of claim 6, wherein the link includes a serial link.

11. The apparatus of claim 10, further comprising layered interconnect stack logic, wherein the transmitter logic and the receiver logic are associated with physical layer logic of the interconnect stack logic.

12. A method comprising:
transmitting a first number of bits at a first amplitude level from a transmitting agent to a receiving agent;
determining at the receiving agent that no errors are detected in the first number of bits;
scaling the first amplitude level to a second amplitude level, which is greater than the first amplitude level, in response to determining that no errors are detected in the first number of bits, wherein scaling the first amplitude level to the second amplitude level comprises: determining a target confidence level value and a measured confidence level value associated with the first number of bits; dividing the target confidence level value by the measured confidence level value to obtain a scaling value; and scaling the first amplitude by the scaling value to obtain the second amplitude.

13. The method of claim 12, wherein scaling the first amplitude level to the second amplitude level, which is greater than the first amplitude level, in response to determining that no errors are detected in the first number of bit comprises:
in response to determining that no errors are detected in the first number of bits, determining the target confidence level value.

14. The method of claim 13, wherein the target confidence level includes a first sigma value on a Gaussian distribution and the measure confidence level includes a second sigma value on the Gaussian distribution, and wherein the first sigma value is larger than the second sigma value.

15. The method of claim 12, further comprising: transmitting a no-error message from the receiving agent to the transmitting agent in response to determining at the receiving agent that no errors are detected in the first number of bits.

16. The method of claim 12, further comprising:
determining at the receiving agent that errors are detected in the first number of bits;
stepping the first amplitude level to a stepped amplitude level;
transmitting the first number of bits at the stepped amplitude level from the transmitting agent to the receiving agent;
determining at the receiving agent that no errors are detected in the first number of bits transmitted at the stepped amplitude level;
scaling the stepped amplitude level to a third amplitude level, which is greater than the stepped amplitude level, in response to determining that no errors are detected in the first number of bits transmitted at the stepped amplitude level.

17. A system comprising:
transmitter logic to transmit a first number of bits on a link at a first differential voltage, wherein the first number of bits is to be associated with a first confidence value; and
receiver logic to receive a no-error message to indicate no errors associated with the first number of bits were detected;
wherein the transmitter logic is to scale the first differential voltage by a ratio of a target confidence value to the first confidence value in response to receiving the message, wherein the first differential voltage is to be scaled to a second differential voltage, wherein the target confidence value and a measured confidence level value associated with the first number of bits are to be determined and the target confidence value is to be divided by the measured confidence level value to obtain a scaling value, wherein the first differential voltage is to be scaled by the scaling value to obtain the second differential voltage.

18. The system of claim 17, wherein the first number of bits is to be associated with a first confidence value includes the first number of bits to be associated with a first sigma value of a Gaussian distribution, and wherein the target confidence value is to be a second sigma value of the Gaussian distribution.

19. The system of claim 17, wherein the receiver logic is further to receive an error message to indicate errors associated with the first number of bits were detected, and wherein the transmitter logic is further to step the first differential voltage by a stepping voltage to a second differential voltage in response to receiving the error message.

20. The system of claim 19, wherein transmitter logic is further to retransmit the first number of bits at the second differential voltage and to scale the second differential voltage by the ratio of the target confidence value to the first confidence value in response to receiving the no-error message after the transmitter logic retransmits the first number of bits.

21. The system of claim 17, wherein the link includes a serial link.

22. The system of claim 17, further comprising layered interconnect stack logic, wherein the transmitter logic and the receiver logic are associated with physical layer logic of the interconnect stack logic.

* * * * *

UNITED STATES PATENT AND TRADEMARK OFFICE
CERTIFICATE OF CORRECTION

PATENT NO. : 8,638,866 B2  Page 1 of 1
APPLICATION NO. : 13/562990
DATED : January 28, 2014
INVENTOR(S) : Andrew Martwick It is certified that error appears in the above-identified patent and that said Letters Patent is hereby corrected as shown below:

In the drawings

On sheet 3 of 4, in Figure 3, line 2,

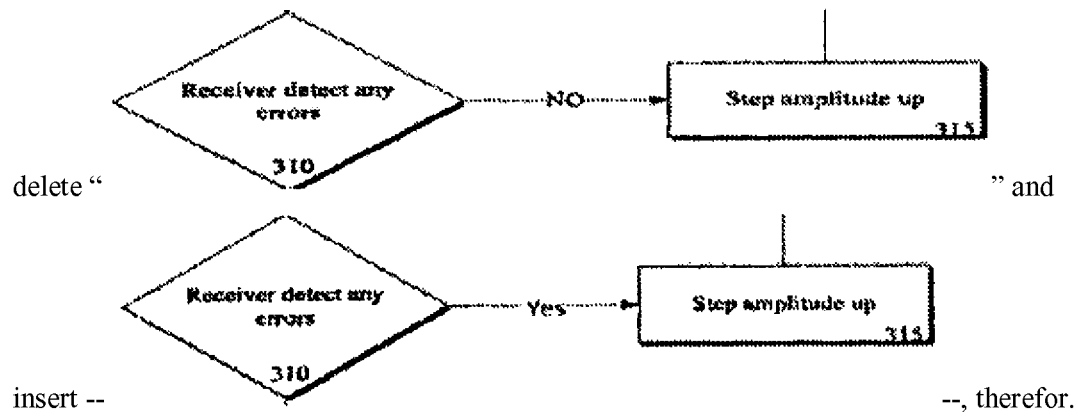

delete " [figure] " and insert -- [figure] --, therefor.

On sheet 4 of 4, in Figure 4, line 13, delete "Amplitued" and insert -- Amplitude --, therefor.

Signed and Sealed this
First Day of July, 2014

Michelle K. Lee
*Deputy Director of the United States Patent and Trademark Office*